(12) United States Patent
Stafford

(10) Patent No.: US 9,030,425 B2
(45) Date of Patent: May 12, 2015

(54) DETECTION OF INTERACTION WITH VIRTUAL OBJECT FROM FINGER COLOR CHANGE

(75) Inventor: Jeffrey Roger Stafford, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 232 days.

(21) Appl. No.: 13/437,710

(22) Filed: Apr. 2, 2012

(65) Prior Publication Data

US 2013/0257751 A1  Oct. 3, 2013

(51) Int. Cl.
*G06F 3/01* (2006.01)
*G06F 3/0488* (2013.01)
*G06F 3/042* (2006.01)

(52) U.S. Cl.
CPC .............. *G06F 3/013* (2013.01); *G06F 3/0488* (2013.01); *G06F 3/011* (2013.01); *G06F 3/0425* (2013.01); *G06F 2203/04808* (2013.01)

(58) Field of Classification Search
CPC .............................. G06F 3/0425; G06F 3/0421
USPC ........................... 345/156, 690, 173–175, 204
See application file for complete search history.

(56) References Cited

U.S. PATENT DOCUMENTS

2006/0190836 A1* 8/2006 Ling Su et al. ............... 715/773
2008/0150899 A1* 6/2008 Lin ............................... 345/168
2009/0218310 A1* 9/2009 Zu et al. ......................... 216/11
2011/0043473 A1* 2/2011 Kozuma ........................ 345/173
2012/0001845 A1* 1/2012 Lee ............................... 345/156

FOREIGN PATENT DOCUMENTS

RU  2011127116    10/2011
WO  WO 95/34881   12/1995

OTHER PUBLICATIONS

Marshall et al., "Pressing the Flesh: Sensing Multiple Touch and Finger Pressure on Arbitrary Surfaces", J. Indulska et al. (Eds.): Pervasive 2008, LNCS 5013, pp. 38-55.
Villamor et al., "Touch Gesture Reference Guide", http://www.lukew.com/touch, Apr. 15, 2010, pp. 1-7.

* cited by examiner

*Primary Examiner* — Ricardo L Osorio
(74) *Attorney, Agent, or Firm* — Martine Penilla Group, LLP

(57) ABSTRACT

Methods, systems, and computer programs are presented for detecting inputs for a computing device. One method includes an operation for receiving images for an area where the hand of a user is situated, and an operation for analyzing the received images to determine the location and the color of a finger of the user. Further, a change in the color of the finger is detected, where the change in the color is caused by contact of the finger with a physical object. In other operation, the method determines the location of the finger when the color change was detected. The determined location is associated with an input for the computing device.

19 Claims, 10 Drawing Sheets

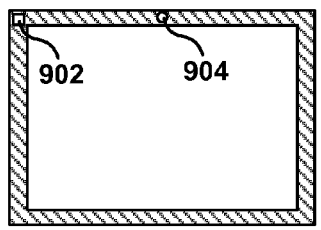
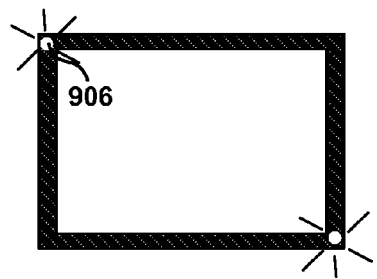
Front / Back
Fig. 9A  Fig. 9B
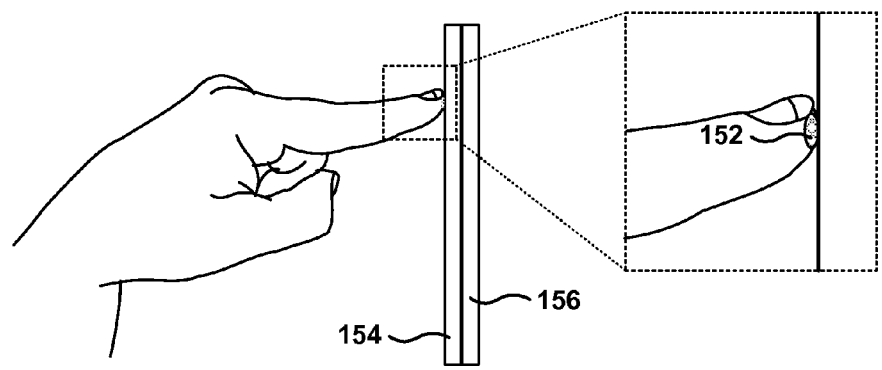
Fig. 10

DETECTION OF INTERACTION WITH VIRTUAL OBJECT FROM FINGER COLOR CHANGE

CROSS REFERENCE TO RELATED APPLICATIONS

This application is related by subject matter to U.S. patent application Ser. No. 13/090,207 filed on Apr. 19, 2011, and entitled "Control of Electronic Device Using Nerve Analysis," which is incorporated herein by reference.

BACKGROUND

1. Field of the Invention

The present embodiments relate to methods for interfacing with a computing device, and more specifically, methods, systems, and computer programs for using image recognition to interface with the computing device.

2. Description of the Related Art

Projected or augmented-reality user interfaces are becoming more widespread, but today's interfaces are limited and need to become easier to use for a wider acceptance by users. For example, a Graphical User Interface (GUI) may be projected onto a surface in the real world and the user must interface with the projection to perform GUI operations. Also, an augmented-reality (AR) device presents a mixture of real objects with virtual objects, and the user must be able to interface with both real and virtual objects to provide a credible AR feeling.

The problem with these projected or AR user interfaces is that they can be displayed on arbitrary surfaces like tables, walls, clothing, etc., and the lighting on the objects may interfere with the operation of the user interfaces. For example a user may want to dial a phone number by pressing virtual buttons on a virtual keypad that is projected onto a wall. However, detecting user interactions with these virtual interfaces is challenging. Existing technologies try to measure the position of the hands and fingers in the real world and correlate that to the virtual world of the graphical interface. However, these methods are approximating that a person is actually pressing near where the button exists, and produce false positives when a finger merely hovers over a button instead of actually pressing the button.

It is in this context that these embodiments arise.

SUMMARY

Embodiments of the disclosure provide methods, systems, and computer programs for detecting inputs for a computing device. It should be appreciated that the present embodiments can be implemented in numerous ways, such as a process, an apparatus, a system, a device or a method on a computer readable medium. Several embodiments are described below.

In one embodiment, a method includes an operation for receiving images for an area where the hand of a user is situated, and an operation for analyzing the received images to determine the location and the color of a finger of the user. Further, a change in the color of the finger is detected, where the change in the color is caused by contact of the finger with a physical object. In another operation, the method determines the location of the finger when the color change was detected. The determined location is associated with an input for the computing device.

In another embodiment, a method for detecting an input for a computing device includes an operation for analyzing images for an area in front of a display where a user is situated to determine a location of eyes and a finger of the user. Further, a change in the color of the finger is detected when the finger is pressed against a transparent surface situated between an eye of the user and the display. In another operation, the method determines a location of the finger and a location of the eye when the change was detected. In addition, a determination is made for an object on the display, which is associated with an intersection of the display with a line joining the location of the eye with the display through the location of the finger. An operation is performed by a computer program based on the determination.

In yet another embodiment, a method includes an operation for receiving images for an area where a hand of a user is situated. The images are analyzed to determine a location and color of a finger of the user. Further, the method includes another operation for detecting a first change in the color of the finger, the change in the color being caused by contact of the finger with a physical object. The location of the finger is determined at the time when the change was detected. In addition, the method tracks the motion of the finger until a second change in the color of the finger is detected, the second change being caused by lack of contact of the finger with the physical object. The determined location and the tracked motion are associated with an input for the computing device.

Other aspects will become apparent from the following detailed descriptions, taken in conjunction with the accompanying drawings.

BRIEF DESCRIPTION OF THE DRAWINGS

The embodiments may best be understood by reference to the following descriptions taken in conjunction with the accompanying drawings.

FIGS. 9A-9B show the front and back of an input device, according to one embodiment.

FIG. 10 illustrates an input device including a transparent surface and an image sensor, according to one embodiment.

DETAILED DESCRIPTION

The following embodiments describe methods, systems, and computer programs for detecting inputs for a computing device. The following embodiments describe methods for receiving user input based on the detection of the slight discoloration that is seen in the tip of a person's fingernails or in the skin of the fingertip as the finger is pressed against a surface.

It will be apparent, that the present embodiments may be practiced without some or all of these specific details. In other instances, well known process operations have not been described in detail in order not to unnecessarily obscure the present embodiments.

Figure 1:
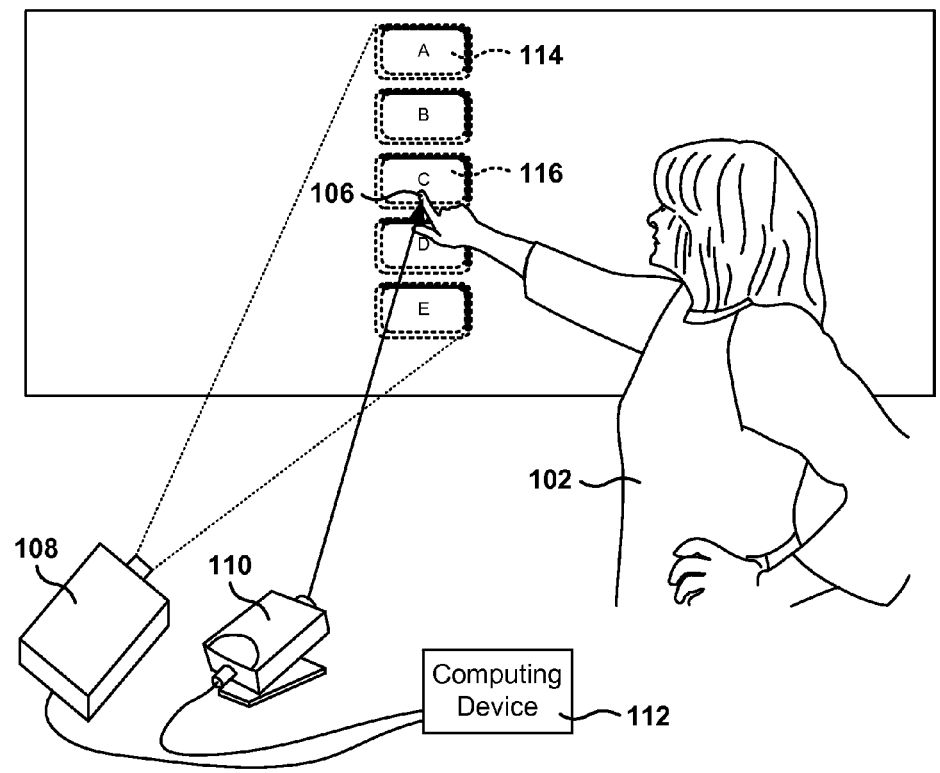
FIG. 1 illustrates a user selecting a virtual button projected on a flat surface, according to one embodiment.

FIG. 1 illustrates a user selecting a virtual button projected on a flat surface, according to one embodiment. A projector 108 is projecting an image on a flat surface, and the image projected includes virtual buttons 114 and 116, which when selected by the user will cause a computer program in computing device 112 to perform an operation based on the received input. Camera 110 takes images of the user, which are utilized by the computing device to determine when the user presses on the surface.

When projecting images of a user interface onto arbitrary surfaces, it is a challenge to detect when a person presses a virtual button. For example, projected images may be utilized in Augmented Reality (AR) environments, where virtual objects are presented together with real objects.

Various methods exist for detecting interaction with projections on arbitrary surfaces, including detecting the shadows caused by the fingers over the projection, etc. However, current methods estimate when the person is pushing on the surface and can produce false positives, e.g., registering a button press as a person's finger hovers above the virtual button without having actually pressed on the button. Another technique determines the position of the fingers by analyzing the shadow cast onto the projection. With this method, it is hard to know exactly if a person is actually pressing a button or just hovering the finger very closely above the button. Additionally, this method does not work for an augment reality interface where there is no actual projection of light into the real world.

In yet another current technique, which object is selected is determined based on the position of the fingers, which includes measuring the fingers' depth within the scene. This could be done using LIDAR, structured light, etc. Unfortunately, because the fingers can obscure the virtual button underneath, some assumptions must be made about the relative depth of the button to the surrounding surface which is not obscured by the finger. This may be a problem if the surface is curved, irregular or unpredictable. Also, assumptions about the depth of the person's finger need to be made. As a result, false positives can arise.

Embodiments presented herein solve the problem of false positives by examining images taken by a camera 110 of the user's hand and detecting the slight discoloration in the fingernails or the fingertips, as the fingers press against a surface. Computing device 112 receives images from camera 110, and analyzes the received images to determine a location of the hand and a location of at least one finger of user 102. Computing device 112 also has information about the image projected by projector 108, either because the computing device 112 sends the image to projector 108 or because computing device 112 receives information about the projected image from the projector 108 or from another device. In yet another embodiment, the computing device analyzes the received images to determine the image projected by the projector.

When user 102 presses her finger 106 on the area associated with virtual button 116, the computing device detects a change in the color of the finger 106 and determines which virtual object from the projected image corresponds to the location where the finger pressed the surface. In the embodiment of FIG. 1, computing device 1012 determines that user 102 has "clicked" virtual button C because the computing device knows the location of the finger and the object projected on that location. In one embodiment, the object selected is determined by performing image analysis to determine the object on the image situated under the fingertip when the fingertip is pressed.

The system tracks the hands and fingers of the user, and based on the color change of the finger, the system determines that the user has pressed down on the surface. To detect this input, there is no requirement to have something attached to the hand, which becomes a virtual mouse with the capability to click on virtual objects. The system senses a remote physical interaction by the user with a physical object.

In one embodiment, a projection is not required and the virtual object may be associated with a real image from a real object. For example, the buttons might be actual images on a poster hung on a wall. Computing device 112 analyzes the image on the wall and associates the finger press with an action corresponding to the place in the real image where the finger pressed. Similarly, if the computing device 112 has no information on the projected image, the computing device analyzes the images projected by the projector.

Figure 2:
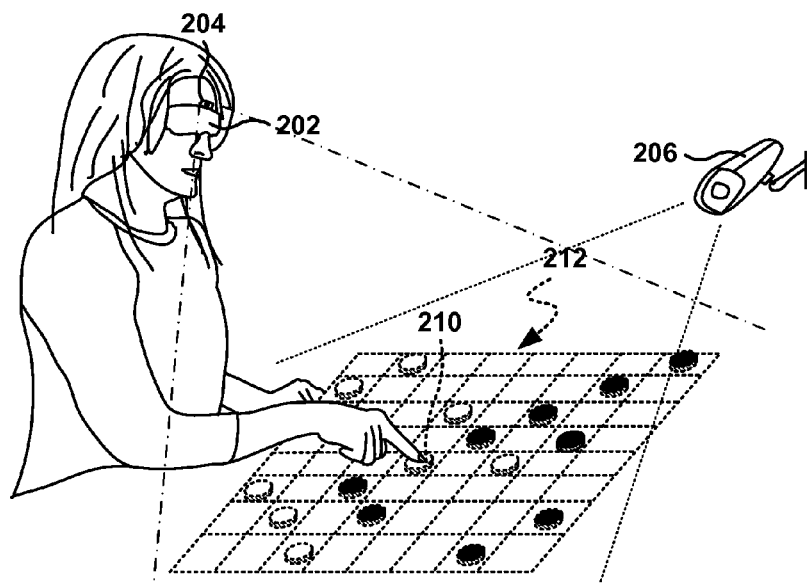
FIG. 2 shows a user, wearing a head mounted display, playing on a virtual board, in accordance with one embodiment.

FIG. 2 shows a user, wearing a Head-Mounted Display (HMD), playing on a virtual board, in accordance with one embodiment. In another embodiment, the video image of the virtual button is not projected onto the real world, but is instead displayed to the person's eyes via the HMD 202. The HMD may augment the user's real vision with the image of the virtual button. In one embodiment, the camera 204 for detecting the finger press is mounted onto the HMD, such that the camera 204 covers substantially the person's field of view.

In another embodiment, the camera 206 for detecting the finger press is located somewhere around the user such that the camera 206 is able to take images of the finger of the user. In the embodiment of FIG. 1, color correction on the images taken by the camera may be required in order to adjust for the projected light on the finger of the user. However, in the embodiment of FIG. 2, color correction is not required because there is no light projected on the finger.

In the embodiment of FIG. 2, the user is playing a virtual game of checkers on virtual board 212. The virtual board 212 is augmented onto a flat surface, e.g., a table. In order to make the move, the user selects a checkers piece 210 by pressing the finger on the flat surface where the selected piece is augmented. After selecting the piece the user slides the finger on the flat surface to make the move, and after the piece has been moved, the user removes the finger from the flat surface to complete the move.

To detect the game operation, the computing device (e.g. computing device 112 of FIG. 1) analyzes the images taken of the finger of the user. When a change is detected in the color of the fingernail or in the fingertip of the user, the computing device determines that the user has performed an input. The computing device determines the location where the user has pressed on the surface, and determines which virtual object corresponds to the location of the finger. This way, the computing device determines which of the checkers pieces has been selected.

The computing device continues monitoring the color of the finger as the finger moves over the flat surface. Because the finger maintains pressure on the flat surface, the discoloration of the finger is continuous, although it might change in intensity based on the amount of pressure placed on the surface. Once the user releases the finger from the surface, the color of the finger will reverse back to the original rest state, and the computing device will detect that the piece move is complete. In one embodiment, the computing device determines which of the squares on the board is associated with the end point for the finger move, and will center the selected checker's piece on that square.

By monitoring the motion of the finger, the finger becomes a virtual mouse that can perform a click-and-drag operation. Therefore, the finger operates as a mouse that can click and can drag GUI objects. It is noted that embodiments may also be utilized on soft surfaces (e.g., a hand, an arm, clothing, etc.), although the user may need to apply more pressure on soft surfaces to cause a change in the color of the fingernail or fingertip.

The embodiments illustrated in FIG. 2 are exemplary. Other embodiments may utilize different cameras, camera locations, HMDs, virtual games, etc. The embodiments illustrated in FIG. 2 should therefore not be interpreted to be exclusive or limiting, but rather exemplary or illustrative.

Figure 3B:
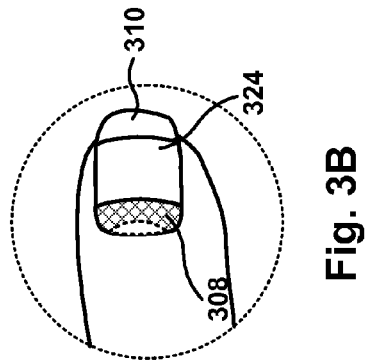
FIGS. 3A-3C illustrate the color change of a fingernail when the finger is pressed against a surface, according to one embodiment.
Figure 3A:
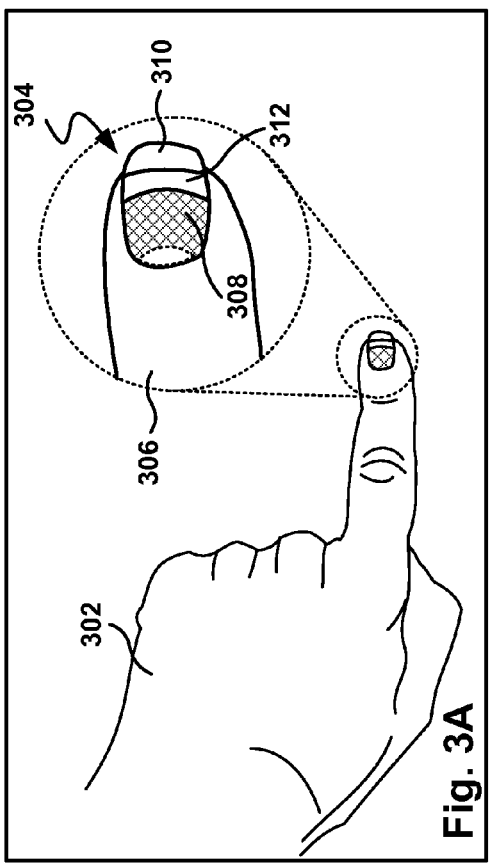
Figure 3C:
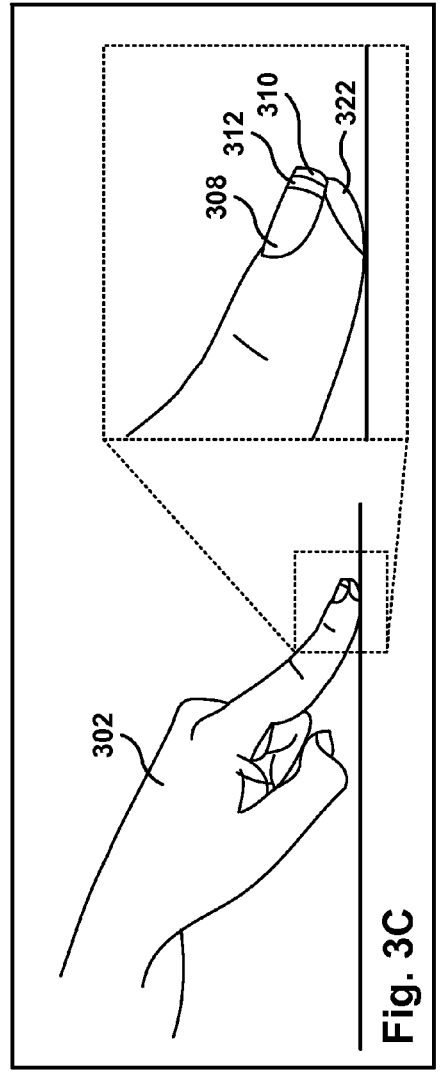

FIGS. 3A-3C illustrate the color change of a fingernail when the finger is pressed against a surface, according to one embodiment. In one embodiment, the system detects changes in the color of a person's fingernails as the finger is pressed on the surface. This discoloration is caused by the deformation of the fingers under pressure causing a change in the flow of blood under the fingernails, typically changing the color from a pink hue to a red or white hue. Although different people may have different changes in color when the fingernail is under pressure (e.g., persons with short nails versus persons with longer nails), most people have some change in the color of the fingernail when the fingertip is pressed on a surface.

FIG. 3A illustrates a top view of a user 302 pressing a finger 306 on a surface. In one embodiment, when nail 304 is pressed the nail may be divided into three different areas: nail base 308, nail tip 310, and nail middle 312. The nail base 308 corresponds to the part of the fingernail is closest to the knuckle. When the finger is pressing on a surface, the nail base 308 does not change color substantially, although the finger may become a little more reddish in appearance.

The nail tip 310 corresponds to the tip of the fingernail and varies in length according to the user. Some people have long fingernails which results in a large nail tip 310, while other people have short fingernails and the nail tip 310 may be small or even nonexistent.

The nail middle 312 is situated between the other two areas nail base 308 and nail tip 310. The nail middle 312 is the area that typically suffers the biggest change in color when the finger is pressed. It is noted that the boundary between nail base 308 and nail middle 312 may change as a function of the amount of pressure made by the finger. When the finger presses slightly on the surface, the nail middle 312 may be rather small, i.e., the area changing color in the fingernail may be small. However, when the finger is pressed hard on the surface, a larger part of the nail turns "white," which means that nail middle 312 is bigger than when the finger is pressed lightly. The boundary between nail middle 312 and nail tip 310 is also referred to herein as a "contrast arc" because the boundary separates the areas of the nail with substantially different coloration.

It is noted that knowing what the actual color that fingers change between is not required. All that is required is being able to detect the change in color caused by the pressure at the fingertips and not caused by different lighting conditions. Since this discoloration effect is only caused by the actual contact of the fingers with a surface, there are reduced or completely eliminated false positives. The person is actually touching a physical surface, just as the person would touch a physical button.

FIG. 3B shows the fingernail at rest, i.e., while the finger is not being pressed on a physical object, according to one embodiment. When the finger is not pressed against a physical object, the nail middle 324 becomes larger presenting a lighter coloration, e.g., white or pink, although other color shades are also possible. It is also possible that the whole nail middle 324 is not white, and there may be a darker area closer to the tip of the nail (not shown).

FIG. 3C shows a side view of a fingertip being pressed on a flat surface. The side view shows that the three different nail areas are also visible from the side, which means that the camera situated to one side of the user is also able to provide images utilized to detect the fingernail color changes. In addition, the side view shows that the fingertip 322 also changes color when the finger presses on a flat surface. The area of the fingertip 322 that changes color includes the area in contact with the flat surface, which is not visible because the area is pressed against the flat surface (of course, unless the flat surface is transparent, which is described in more detail below with reference to FIG. 6), and an area next to the area in contact with the flat surface. Area 322 becomes "whiter" when pressure is applied on the finger. As a result, embodiments may be able to detect that the finger is pressed against a flat surface by analyzing the color change of the fingernail as well as the color change in the fingertip.

In order to detect color changes, the camera must be situated such that the camera may take pictures of the users hands. The computing device must be able to analyze the images from the camera in order to determine the location of the hand and of the fingers in the hand. In addition, the camera must have enough resolution in order to detect the color changes in the fingernails or fingertips.

Figure 4B:
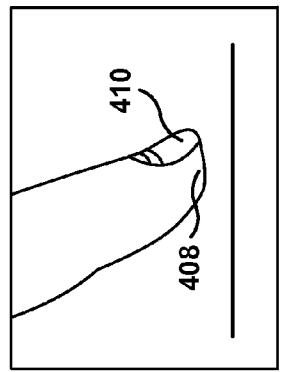
FIGS. 4A-4C illustrate the color change of the fingernail when the finger if pressed substantially vertically to the surface, according to one embodiment.
Figure 4A:
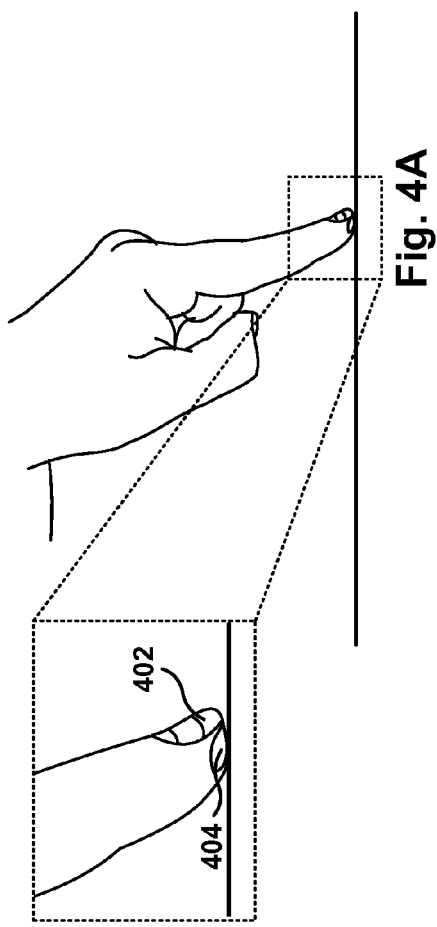
Figure 4C:
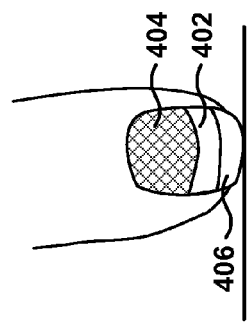

FIGS. 4A-4C illustrate the color change of the fingernail when the finger is pressed substantially vertically to the surface, according to one embodiment. The arc or line separating the different areas of the nail may depend on the angle in which the finger hits the surface. FIG. 4A shows a finger pressing on a flat surface where the finger is substantially perpendicular to the surface. In contrast, the fingers of FIGS. 3A-3C show a finger with an angle with the surface of about 45 degrees or less.

In the embodiment of FIG. 4A, the color of the fingernail (and the fingertip) changes as described above but, typically, the white area of the fingernail will be bigger when the same amount of pressure is applied as in the embodiment in FIG. 3A.

FIG. 4B is a side view of the finger after the finger is removed from the surface, i.e., when the finger is at rest. As in the case of FIG. 3B, the middle section 410 is lighter in color when the finger is not pressed against the object. In addition, the fingertip 408 does not present a light coloration.

FIG. 4C shows a fingernail that extends beyond the fingertip, and when the user presses the finger on the surface, the nail makes contact with the surface. The whitening effect accelerates and intensifies due to the contact of the nail with the surface. In fact, when pressure is applied on the nail the white area might extend all the way to the base of the fingernail, which makes detecting the color change easier. It is noted that embodiments may be utilized for detecting finger color changes in persons with short nails as well as in persons with long nails, because in both cases the fingernail and the fingertip change color even though the person with the longer nails will have a more intense whitening effect.

In one embodiment, the system performs a calibration to account for variability in the changes in color for each person when the person presses the finger. In one embodiment, the calibration includes a first operation where the system asks the user to present the finger to the camera and not press on anything. The system then analyzes the color of the fingernail and/or the fingertip when the finger is not pressed against a physical object. In the second operation, the system request the user to press the finger against a flat surface and the second measurement is taken to check the color of the fingernail and/or fingertip.

The calibration allows the system to detect small changes in coloring, so a user does not have to press too hard to get a reaction. However, calibration is not required to implement embodiments described herein. Calibration also allows finding a good comfort level for each person to determine when the button is pressed, as some people may wish to press hard while others may wish to press lightly.

Figure 5:
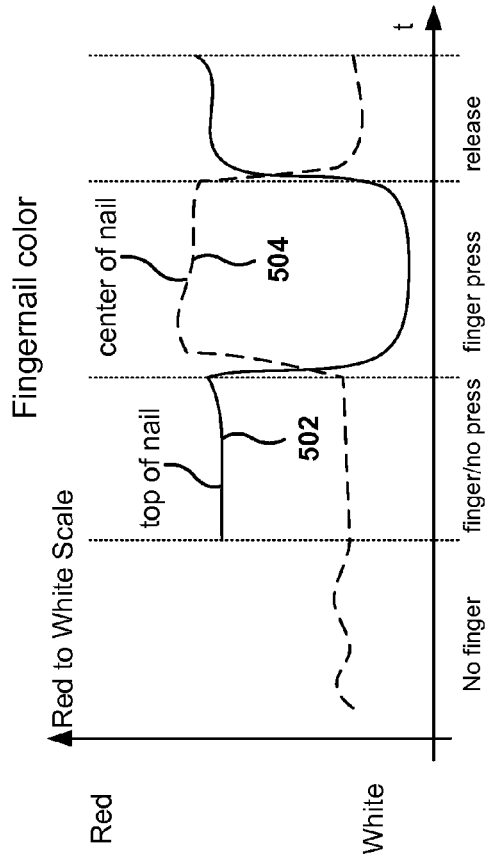
FIG. 5 is a chart showing how the finger changes colors, according to one embodiment.

FIG. 5 is a chart showing how the finger changes colors, according to one embodiment. The vertical axis in FIG. 5 corresponds to a scale on the amount of red of the fingernail. Consequently, the scale goes from white to red. When using an RGB system, typically, the color of the fingernail will have a high component of the red tint and varying levels of green and blue. Of course, white corresponds to high levels of red, green and blue, while a bright red corresponds to a high level of red and low levels, if any, of green and blue.

The horizontal scale in FIG. 5 corresponds to time, and the chart is divided in different states according to the activity of the user. The four states include a first state with no finger present, a second state when the finger is present but the finger is not pressing against any physical object, a third state when the finger is present against a physical object (e.g., a flat surface), and a fourth state after the finger releases the pressure from the physical object.

Line 502 indicates the color of the top of the nail during the different states, line 504 charts the color of the center of the nail. As seen in FIG. 5, the top of the nail has a reddish color when the finger is not pressed against the object and when pressure is exerted on the finger, the top of the nail becomes white or a light red. After the finger is released from the surface, the top of the nail gradually returns to its original color.

The center of the nail behaves a little differently, and has a lighter color when there is no pressure, but turns red when the finger presses on the surface. It is noted that the embodiment of FIG. 5 is exemplary, and different people may have different changes in color according to pressure. The embodiment illustrated in FIG. 5 should therefore not be interpreted to be exclusive or limiting, but rather exemplary or illustrative.

In one embodiment, the system tracks both the top of the nail and the center of the nail when detecting nail color changes. In other embodiments only one or the other are tracked, and yet another embodiment an average score for the whole nail is calculated, and the detection system will compare the average color of the nail over time to detect when the nail changes color.

The following are operations for one embodiment of a method to detect a finger press when the finger is pressing on an image from a projector (e.g., the embodiment described above with reference to FIG. 1).

1. Capture the first image from the video camera.
2. Analyze the image, using image analysis techniques (e.g., image segmentation) and find the area in the image containing the hand.
3. Analyze the area containing the hand for fingers, using assumptions about the anatomy of hands.
4. Determine where in the image capture the projected button exists, using assumptions of the co-locations of the projector and video camera and knowing or detecting the appearance of the button image.
5. Identify the areas showing the fingernails that overlap the projected button.
6. Perform color correction to reduce the color effects of the projected button on the fingernail areas.
7. Gather statistics (e.g., average color) about the color of the pixels for each finger nail area.
8. Capture another image from the video camera.
9. Repeat operations 2 and 3 to determine new finger areas.
10. Determine in the image capture where the projected button exists.
11. Determine the fingernail areas that roughly match the fingernail areas from the previous image capture, and that overlap the area of the projected button.
12. Perform color correction to reduce the color effects of the projected button onto the remaining finger nail areas.
13. Gather statistics about the color of the pixels for the remaining finger nail areas.
14. Repeat operations 8 to 13 for a predetermined period of time (e.g., 100 milliseconds, although other values are also possible).
15. If no fingernail areas have been detected after this time, go back to operation 1.
16. Calculate the rate of change from all the color statistics gathered from the remaining fingernail areas.
17. If the rate of color change (e.g., the change in average color) for all the fingernail areas is below a certain threshold, go back to operation 1.
18. If the rate of color change is above a certain threshold, signal that the virtual button was pressed.

In another embodiment, the color detection is based on analyzing the contrast arc created at the tip of the fingernail, where the tip becomes whiter, creating additional contrast in the image of the fingernail. Image processing software is utilized to detect the appearance of this 'contrast arc'.

It is appreciated that the methods described above are exemplary. Other methods may utilize different color and image analysis techniques, without some of the operations described above (e.g., color correction), etc. The above embodiments should therefore not be interpreted to be exclusive or limiting, but rather exemplary or illustrative.

Figure 6:
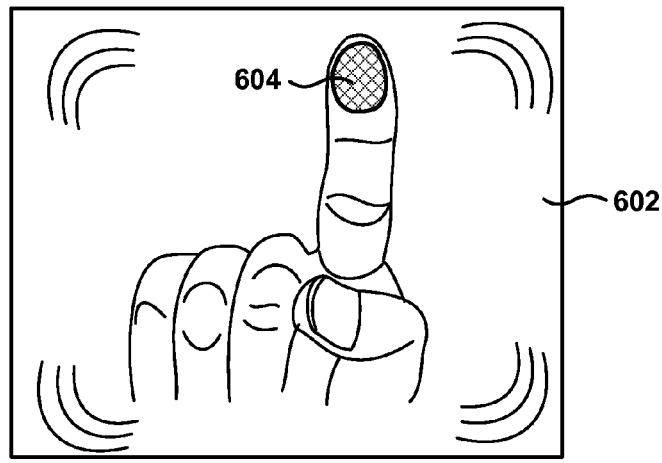
FIG. 6 illustrates the change in the color of the fingertip when the finger is pressed against the transparent surface, according to one embodiment.

FIG. 6 illustrates the change in the color of the fingertip when the finger is pressed against a transparent surface, according to one embodiment. If the finger is pressed against the transparent surface (e.g., glass 602) and the camera is on the other side of the glass, images may be taken of the fingertip 604 as the finger presses on the glass. In this case, the color of the skin on the fingertip changes, and the finger pressing on the surface is detected by analyzing the change in the color of the fingertip.

When the finger presses against the glass 602, the skin becomes whiter, and the discoloration extends to an area in the finger around the place where the finger is touching the glass. Therefore, the method to detect the finger press by detecting a color change of the fingertip is similar to the method for detecting the color change in the fingernail, except that the image analysis will focus on the area of the fingertip instead of the area of the fingernail.

In some embodiments, the system determines when the finger starts applying pressure on the surface by detecting a change in the finger color, going from the color when the finger is at rest to the color when the finger is pressed. In other embodiments, the system determines when the finger ends applying pressure on the surface by detecting a change in the color from the finger being pressed to the color of the finger when at rest. In some applications, the input will be received when the finger begins applying pressure, while in other applications, the input is received when the finger terminates applying pressure.

In other embodiments, a thermal camera or other thermal sensing device is utilized to check for changes in the temperature of the finger. When a change is detected in the temperature of the finger, the system assumes that the finger is pressing against a surface and determines that an input has taken place.

In some embodiments, other parts or appendices of the human body may be similarly tracked to determine contact with a physical object. For example, a disabled person may be able to utilize the tip of her nose to make contact with a glass (or some other physical surface) to perform a selection. Other parts of the body may also be utilized, such as an elbow, the tongue, a toe, the bottom of the foot, the forehead, etc. For example, a toe may be utilized to select menu options on a floor scale. It is noted that the same principle of detecting the color change caused by the change in blood flood under the skin may be utilized for the other parts of the body.

Figure 7:
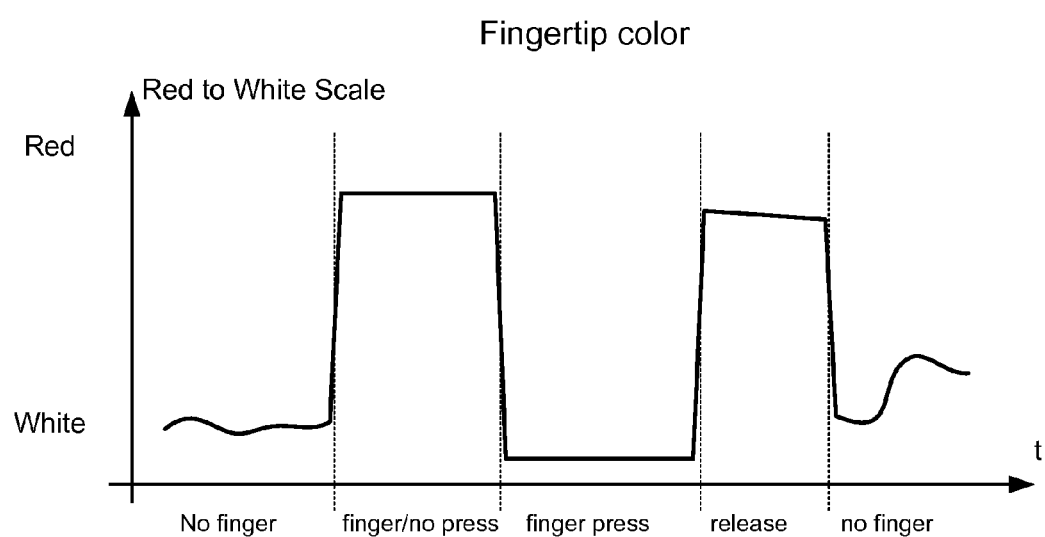
FIG. 7 is a chart showing how the color changes in the fingertip, according to one embodiment.

FIG. 7 is a chart showing how the color changes in the fingertip, according to one embodiment (e.g., FIG. 6). The chart of FIG. 7 is similar to the chart of FIG. 5, except that it refers to the changes in the color of the fingertip. When the finger is at rest (i.e., not pressing against a physical object), the fingertip presents a reddish color. After the finger is pressed against the surface, the area in contact with the surface, and possibly some of the area surrounding the contact area, becomes white or has a light color.

After the finger is released from the pressure on the surface, the color starts returning back to the original red hue. It is noted that different people may have different skin color, and the embodiments described herein apply people with different types of skin. Although the color shading may be different for different people, what is common to everybody is that the fingertip changes color (mostly becoming lighter) when pressed against the glass. Although some embodiments described herein with reference to color with a red hue, it is understood that the embodiments also apply to other types of color skin.

As described above with reference to the fingernail changes, a calibration procedure may be utilized to calibrate the color of the skin when the finger is at rest and when the finger is being pressed against a surface.

Figure 8A:
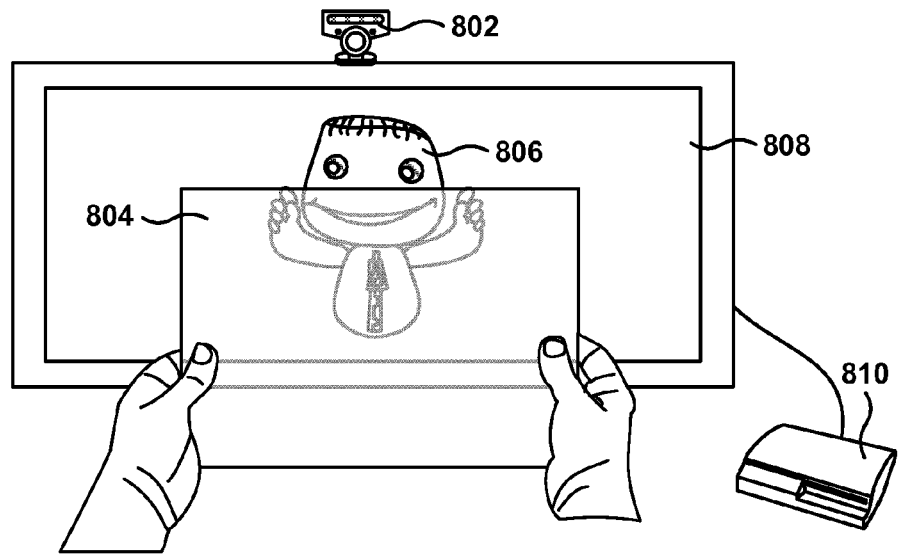
FIG. 8A-8F illustrate embodiments of users pressing the finger on a clear surface to interface with a computing device.

FIGS. 8A-8F illustrate embodiments of users pressing the finger on a clear surface to interface with a computing device. In FIG. 8A, the user is holding, with both hands, a piece of glass 804 or transparent plastic, which is used to interface with the computing device 810 (e.g., a game console, although other computing devices are also possible). Although embodiments are described herein with reference to a piece of glass 804, embodiments may also be implemented with any other type of transparent material, such as plastic, clear silicone, etc.

The user holds out the glass 804 in such a way to be able to see the display 808 through the glass. A camera 802 is utilized to take images of the user, and the camera 802 is utilized to detect one or more of the hands, the fingers, the face, the glasses worn by the user, the torso, etc.

Figure 8B:
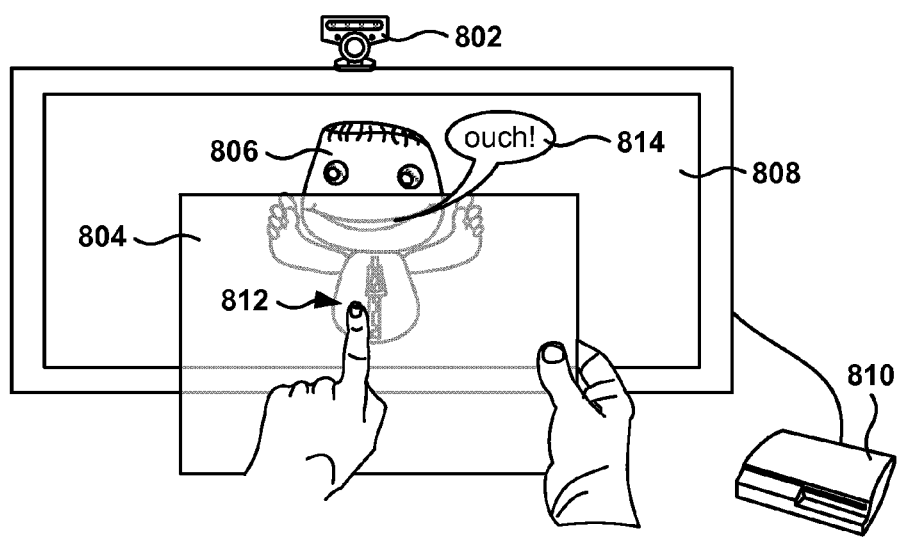

FIG. 8B shows the user interacting with an object 806 on the display 808. In order to select the object 806 on the display, the user presses the finger 812 on glass 804 in an area of the glass corresponding to the object on the display. Camera 802 takes images of the user, and the computing device detects the finger press on the glass, as described above with reference to FIG. 6. In another embodiment, the camera may be situated behind or to the side of the user, and the finger press may be detected by analyzing the changing of the color of the fingernail, as described above.

In the embodiment of FIG. 8B, when the user presses the finger 812 on the glass 804, the computer program analyzes the input, determines that the input corresponds to the area where an animated FIG. 806 is situated, and creates an interaction with the animated FIG. 806. For example, the animated FIG. 806 talks back 814 to the user in response to the finger pressed on the glass 804.

Figure 8C:
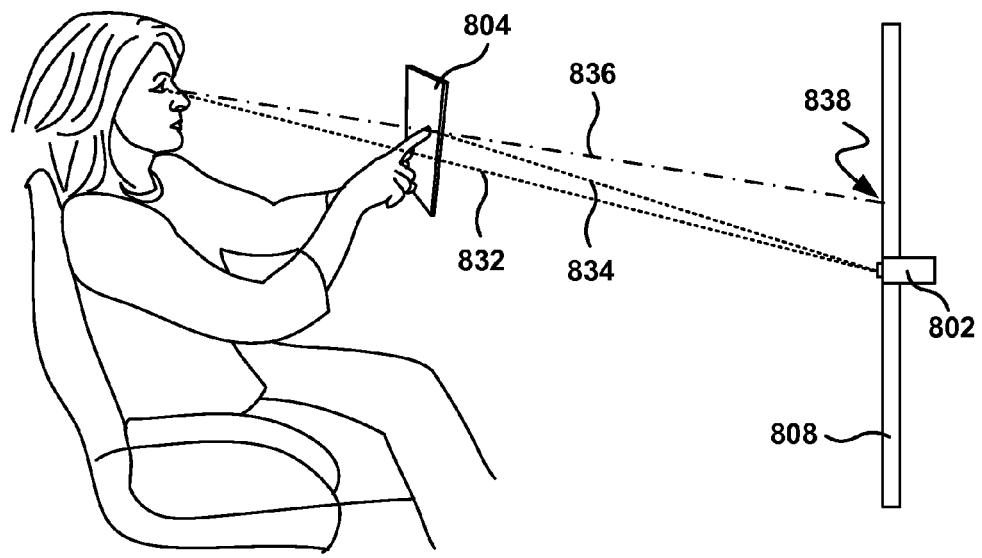

FIG. 8C is a side view of the user interacting with the computing device using glass 804. The camera 802 takes images of the user, which are analyzed by the computing device to detect the position 832 of one or both eyes of the user, and the positions of one or more fingers 834. In another embodiment, the image analysis is also utilized to detect a position of the glass 804, which may include an opaque border, or some other marker, that enables image recognition to detect the glass on an image. See for example the embodiments described below with reference to FIGS. 9A-9B.

When the system detects a finger pressed on the glass 804, the system determines that an input has taken place. A line 836 is calculated, where the line originates at one of the eyes of the user (or somewhere between the eyes, or somewhere else on the head, such as the nose or the center of the head) and passes through the finger location corresponding to the finger press. The line is extended and the system determines where the line 836 intersects 838 with the display 808. The intersection of the line with the display defines a point 838 on the display, and the point 838 is associated with an input from the user. In one embodiment, the system processes the input as if the user had a mouse on the display, and a click of the mouse was performed when the mouse cursor was over point 838.

In another embodiment, the computing device may determine which object on the display is associated with the intersection point, and perform an operation based on this object or the intersecting point.

In other embodiment, the system does not utilize gaze detection in order to facilitate interaction with the computing device. For example, the glass and the finger over the glass may be utilized as a mouse. A cursor on the display may be moved by pressing the finger on the glass and then moving the finger around. In addition, a click of the mouse may be detected when the finger is pressed against the glass. For these operations, it is not necessary to determine a location of the eyes, although some embodiments may utilize the location of the eyes to complement determining the location of the finger.

Embodiments described herein to detect user input based on the user performing a press with the finger may also be utilized in multi-touch operations. In fact, embodiments described herein do not have the limitations the other multi-touch systems have. Some multi-touch systems are based on establishing a current that passes through a point where the user is touching the screen. A series of horizontal and vertical wires are situated below the surface, and when the user presses on the surface, the shorts created between the horizontal and vertical wires enable the system to determine the location of the touch. However, when the user touches in several places at the same time, the system may establish the multi-touch wrong due to the interference on the wires by the multiple fingers.

Figure 8D:
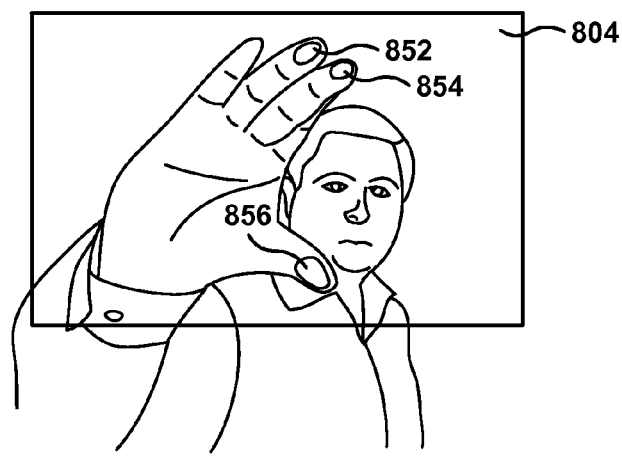

The embodiments described herein may be utilized with multi-touch applications by detecting two or more fingers as they are being pressed on the glass 804. In the embodiment of FIG. 8D, the user is performing a virtual grab of a tennis ball on the display. The user has three fingers that are in contact with the glass, which creates three areas 852, 854, and 856 where the fingertips have suffered discoloration. The system is able to detect the three separate areas and detect the multi-touch operation. The multi-touch operation may be utilized for zooming in and out the view on the display, grabbing an object on the display, rotating an object on the display, performing the equivalent of a "right-click" with the mouse, etc.

The multi-touch operation may also be combined with the tracking of the movement of a finger, pressed on the glass, as the finger moves around the surface of the glass. Therefore, the detection and tracking of the finger pressed on the glass enables inputs such as moving an object, moving a cursor, breaking an object, opening an object, opening a menu, opening multiple menus, opening or closing an application, selecting from a menu, changing the channel, changing a picture-in-picture setting, pausing a game, etc.

Figure 8E:
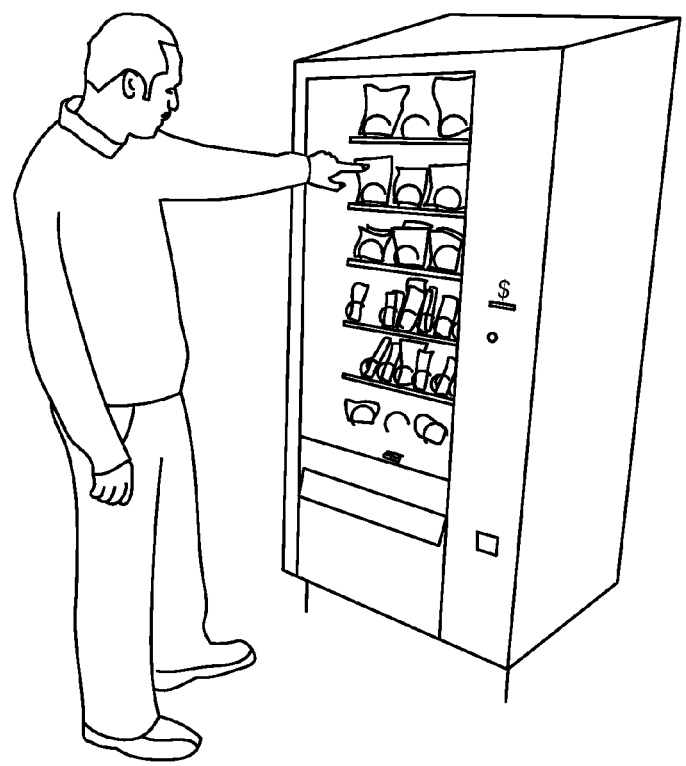

FIG. 8E shows a vending machine with optical finger-press recognition, according to one embodiment. A camera inside the vending machine tracks the finger in order to detect a selection of the item to be dispensed. In one embodiment, the camera tracks the eyes of the user as well as the finger pressing on the glass, as described above with reference to FIG. 8C. Image analysis determines which item in the vending machine is selected by identifying which item is associated with the line from the eyes, through the fingertips, and towards the selected item.

In another embodiment, the glass in the vending machine acts as a big mouse pad. As the user moves the finger in front of the glass, the motion of the finger is utilized to change which item is to be dispensed, which is highlighted for the user (e.g., an LED below the item). Once the user presses on the glass, the selected item will be dispensed. In another embodiment, the finger must be pressed for a certain amount of time in order to avoid false positives. In yet another embodiment, the selection is changed while the user drags the finger across the glass, while making contact with the glass. To make a selection, the user double-taps the glass once the right item is identified by the vending machine.

Figure 8F:
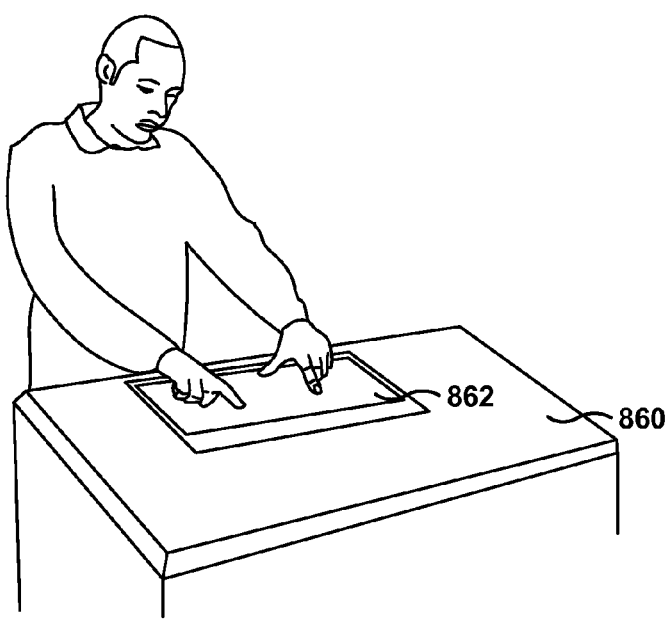

FIG. 8F illustrates a transparent (or partially transparent) display 860 with multi-touch capability, according to one embodiment. Images are presented on multi-touch display 860. The user is able to manipulate objects on the display, such as window 862, pictures, videos, games, word processors, etc. A camera situated below display 860 (although other positions for the camera are also possible) is utilized to detect when the finger, or fingers, of the user are pressed against the display. In one embodiment, color correction is performed in order to compensate for the image on the display. In the embodiment of FIG. 8F the user is zooming on window 862 by touching the window with the fingers and then moving the hands in a stretch motion to expand window 862. As discussed above, embodiments described herein do not have the limitations of other technologies were multiple touches of the fingers could interfere with each other. Each finger is analyzed separately (image analysis) to detect when the finger is pressed on the glass, and/or when the finger is moving across the surface while maintaining contact with the surface.

Pressing on a glass, optionally in combination with face or eye tracking, may also be utilized in a plurality of other applications, such as using a car window to perform selections on a drive-through restaurant, interfacing with a store window or an automated teller machine (ATM), etc. The embodiments illustrated herein should therefore not be interpreted to be exclusive or limiting, but rather exemplary or illustrative.

FIGS. 9A-9B show the front and back of an input device, according to one embodiment. FIG. 9A is a front view of one embodiment with a partially transparent surface that may be utilized to interface with a computing device, such as the one shown in FIGS. 8A-8B. The surface is mostly transparent but it has an opaque border. Since the device has an opaque border, the image detection is able to find the border of the glass in order to improve the locating of the finger when the finger presses against the glass.

In one embodiment, the piece of glass may have a camera 904 facing the user. Images taken with this camera are utilized to assist in the determination of the gaze of the user or the location of the eyes of the user.

FIG. 9B shows a back view of the glass panel. In one embodiment, the back of the panel includes Light Emitting Diodes (LEDs) 906 for easy location of the panel utilizing image recognition. The brighter areas are detected by the computing device in the images received from the camera. The panel may include one, two, four, or some other amount, of LEDs in the back. In one embodiment, the back of the panel also includes a retro reflective material to assist in the location of the panel.

FIG. 10 illustrates an input device including a transparent surface and an image sensor, according to one embodiment. An interface panel includes a transparent material 154, such as glass, in front of an image taking panel 156 able to detect images of objects situated in front of the panel. The panel 156 may include a plurality of image capturing devices (e.g., sensors), where each image capturing device takes images of a certain region in front of the panel 156. This way, the plurality of image sensors and devices are utilized to detect changes in the glass 154. This way, the panel may be situated against a wall without requiring a large amount of space for a camera to take images of the whole glass panel 154. It should be noted that other forms of image capturing surfaces (e.g., optical waveguides) may be used, therefore, this embodiment should not be interpreted to be exclusive or limiting, but rather exemplary or illustrative.

It is also noted that in other embodiments, a specialized camera may be utilized that is sensitive to the wavelengths associated with the colors of the fingernails or the fingertips.

Figure 11:
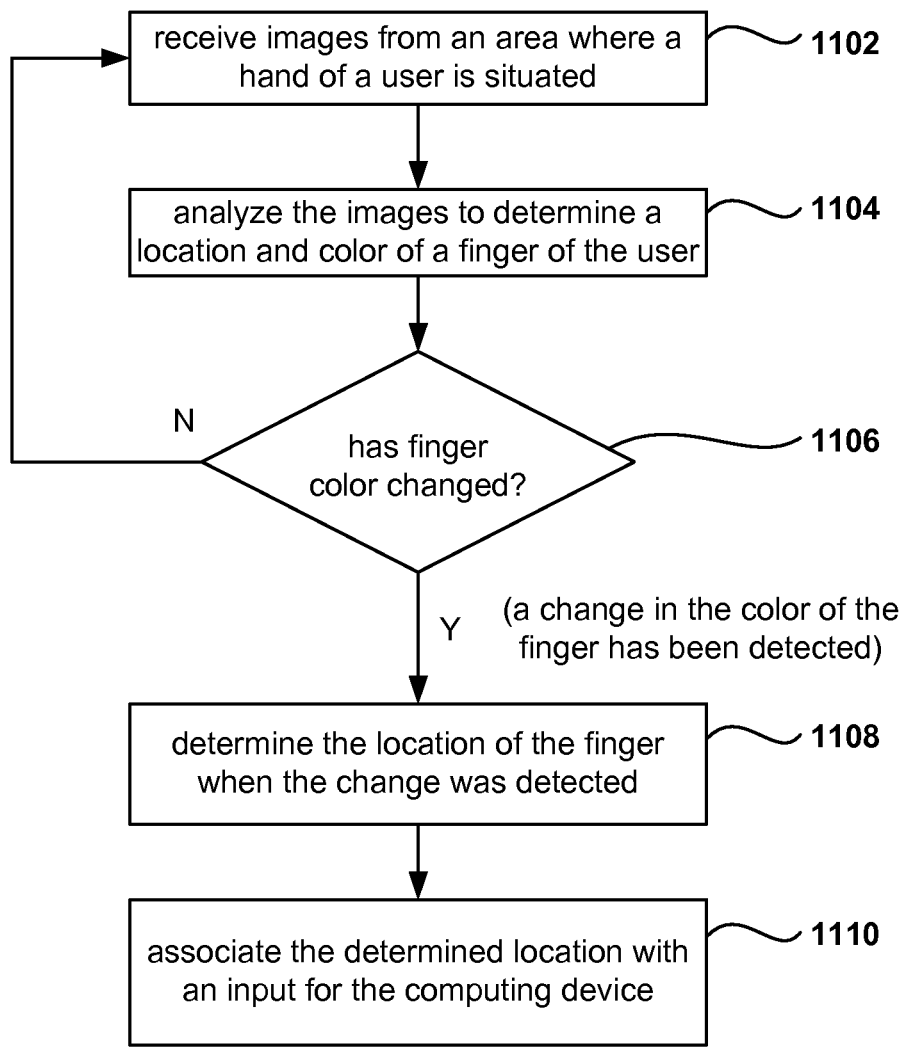
FIG. 11 shows a flowchart illustrating an algorithm for detecting an input for a computing device, in accordance with one embodiment.

FIG. 11 shows a flowchart illustrating an algorithm for detecting an input for a computing device, in accordance with one embodiment. In operation 1102, images are received for an area where a hand of the user is situated. From operation 1102, the method flows to operation 1104 where the images are analyzed to determine the location and color of the finger of the user.

Further, in operation 1106, a check is made to determine if the finger color has changed. The color of the finger may change because of a change in the fingernails or a change in the fingertips, or in any other area of the finger associated with a press of the finger over a physical object. If the check in operation 1106 determined that the color of the finger had changed, the method flows to operation 1108, and if no change in color was determined then the method goes back to operation 1102.

In operation 1108, the location of the finger is determined at the time that the color change of the finger was detected. In operation 1110, the location determined in operation 1108 is associated with an input for the computing device (e.g., a click on an object on the display).

Figure 12:
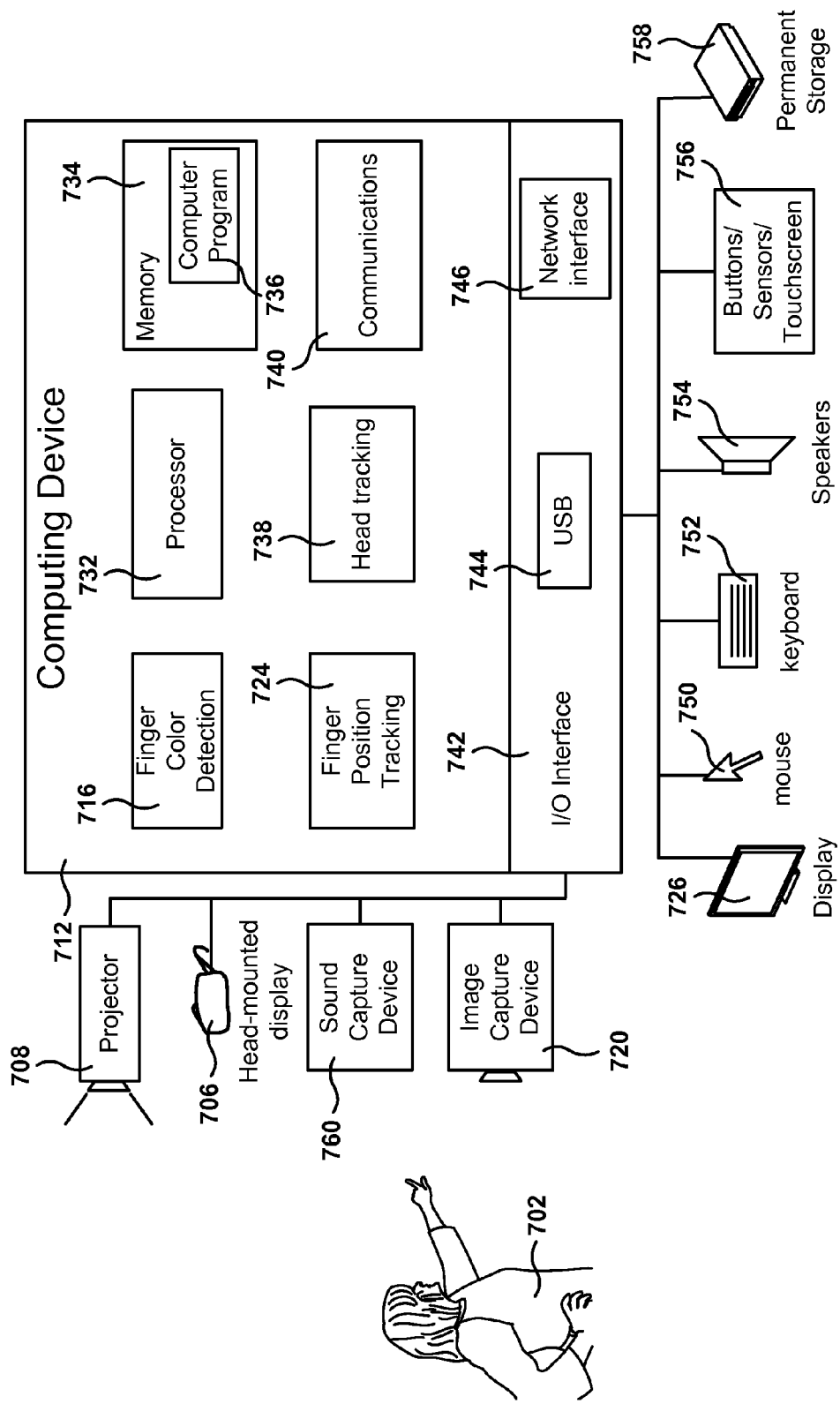
FIG. 12 is a simplified schematic diagram of a computer system for implementing embodiments described herein.

FIG. 12 is a simplified schematic diagram of a computer system for implementing embodiments described herein. It should be appreciated that the methods described herein may be performed with a digital processing system, such as a conventional, general-purpose computer system. Special purpose computers, which are designed or programmed to perform only one function, may be used in the alternative. Computing device 712 includes a processor 732, which is coupled to memory 734, to permanent storage device 758, and to other modules inside, or connected to, computing device 712. User interface computer program 736 resides in memory 734, but can also reside in permanent storage device 758.

Computing device 712 is in communication with projector device 708, image capture device 720, head mounted display 706, and display 726. In one embodiment, projector device 708, image capture device 720, and display 726 may be embedded within computing device 712, or may be combined into one or more devices.

Finger Position Tracking module 724 determines the position of the hand or one or more fingers of the user, and determines when user 702 makes contact with a physical object. Finger Color Detection module 716 processes the images received from image capture device 720, and performs image analysis to determine when the finger changes color. Computer program 736 receives inputs from Finger Position Tracking module 724, Finger Color Detection module 716, and head tracking module 738, to implement the embodiments described above.

Permanent storage device 758 represents a persistent data storage device such as a floppy disc drive or a fixed disc drive, which may be local or remote. Network interface 746 provides network connectivity, allowing communications with other devices. It should be appreciated that processor 732 may be embodied in a general-purpose processor, a special purpose processor, or a specially programmed logic device. Input/Output (I/O) interface 742 provides communication with different peripherals, such as display 726, keyboard 752, mouse 750, sound capture device 760, image capture device 720, speakers 754, buttons, sensors, touchscreen 756, etc. A Universal Serial Bus (USB) module 744 provides connectivity to USB devices.

Display 726 and head-mounted display 706 are configured to display the user interfaces described herein. Keyboard 752, mouse 750, and other peripherals are coupled to I/O interface 742 in order to communicate information to processor 732. It should be appreciated that data to and from external devices may be communicated through I/O interface 742. The embodiments can also be practiced in distributed computing environments where tasks are performed by remote processing devices that are linked through a wire-based or wireless network.

It is noted that the embodiment illustrated in FIG. 12 is exemplary. Other embodiments may utilize different modules, or have several functions performed by one module, etc. The embodiment illustrated in FIG. 12 should therefore not be interpreted to be exclusive or limiting, but rather exemplary or illustrative.

Embodiments of the present disclosure may be practiced with various computer system configurations including handheld devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein are useful machine operations. The embodiments also relate to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for detecting an input for a computing device, the method comprising:
   receiving, from one image capture device, images of a surface, the surface including one or more selection areas;
   analyzing the received images to identify the positions of the one or more selection areas in the received images;
   analyzing the received images to determine a location and color of a finger of a user when the finger is present between the image capture device and the surface;
   detecting a change in the color of the finger based on the analysis of the received images, the change in the color being caused by contact of the finger with the surface; and
   determining if a location of the finger when the change was detected corresponds to the position from any selection area to create an input for the computing device.

2. The method as recited in claim 1, wherein detecting a change in the color of the finger further includes:
   determining a color of a fingernail of the finger when the finger is untouched by any object; and
   detecting a change in the color of the fingernail.

3. The method as recited in claim 2, wherein the change in the color is detected in a tip of the fingernail.

4. The method as recited in claim 1, wherein detecting a change in the color of the finger further includes:

determining a color of skin on a fingertip of the finger when the finger is untouched by any object; and detecting a change in the color of the fingertip.

5. The method as recited in claim 4, wherein detecting a change in the color of the finger further includes:

detecting a change in a color of a fingernail of the finger at a same time of the change in the color of the fingertip.

6. The method as recited in claim 1, wherein the surface is illuminated with an image projected by a projector device, the image projected by the projector device defining the one or more selection areas actionable by the user.

7. The method as recited in claim 6, wherein analyzing the images further includes:

performing color correction on the images based on light emitted by the projector.

8. The method as recited in claim 1, wherein the user is wearing a head mounted display, wherein associating the determined location with an input further includes:

determining which virtual objects displayed by the head mounted display in an augmented or virtual reality environment is associated with the location of the finger.

9. The method as recited in claim 1, further including:

performing a calibration to determine a natural color of the finger of the user.

10. The method as recited in claim 1, wherein operations of the method are performed by a computer program when executed by one or more processors, the computer program being embedded in a non-transitory computer-readable storage medium.

11. The method as recited in claim 1, wherein the surface is part of a real object having the one or more selection areas actionable by the user.

12. A method for detecting an input for a computing device, the method comprising:

receiving, from one image capture device, images of a surface that includes one or more selection areas;

analyzing the received images to identify the positions of the one or more selection areas in the received images;

analyzing the received images to detect location and color of one or more fingers of a user when the finger is present between the image capture device and the surface;

detecting change in the color of any of the fingers based on the analysis of the received images, the change in color being caused by contact of any finger with the surface; and determining if a location of the finger changing color corresponds to the position from any selection area to create an input for the computing device.

13. The method as recited in claim 12, wherein detecting change in the color of the finger further includes:

determining a color of a fingernail of the finger when the finger is untouched by any object; and detecting a change in the color of the fingernail.

14. The method as recited in claim 13, wherein the change in the color is detected in a tip of the fingernail.

15. The method as recited in claim 12, wherein detecting a change in the color of the finger further includes:

determining a color of skin on a fingertip of the finger when the finger is untouched by any object; and detecting a change in the color of the fingertip.

16. The method as recited in claim 15, wherein detecting a change in the color of the finger further includes:

detecting a change in a color of a fingernail of the finger at a same time of the change in the color of the fingertip.

17. The method as recited in claim 12, wherein the surface is illuminated with an image projected by a projector device, the image projected by the projector device defining the one or more selection areas actionable by the user.

18. The method as recited in claim 12, wherein the surface is part of a real object having the one or more selection areas actionable by the user.

19. The method as recited in claim 12, wherein a double-touch is determined as the input when two of the fingers are detected changing color.

* * * * *